United States Patent [19]

Neal et al.

[11] 3,890,803

[45] June 24, 1975

[54] TORQUE TRANSMITTING DEVICE WITH TORQUE LIMITING DEVICE

[75] Inventors: Francis John Neal; John Richard Simmons, both of Wolverhampton, England

[73] Assignee: Lucas Aerospace Limited, Birmingham, England

[22] Filed: Jan. 28, 1974

[21] Appl. No.: 437,481

[30] Foreign Application Priority Data
Feb. 3, 1973 United Kingdom............... 5466/73

[52] U.S. Cl..................... 64/27 B; 64/27 R; 64/9; 64/15; 64/1 V; 188/134
[51] Int. Cl............................................. F16d 3/14
[58] Field of Search ........ 64/27 B, 27 R, 15 B, 1 V, 64/6, 9 R, DIG. 2, 29, 30 R; 188/134

[56] References Cited
UNITED STATES PATENTS

| | | | |
|---|---|---|---|
| 2,334,734 | 11/1943 | Taylor | 188/134 |
| 2,822,677 | 2/1958 | Reynolds | 64/27 B |
| 3,236,066 | 2/1966 | Webb | 64/27 B |
| 3,499,511 | 3/1970 | Bouhot | 188/134 |
| 3,640,092 | 2/1972 | Neat et al. | 64/28 |
| 3,675,745 | 7/1972 | Bouhot | 188/134 |

*Primary Examiner*—Benjamin W. Wyche
*Assistant Examiner*—Randall Heald
*Attorney, Agent, or Firm*—Cushman, Darby & Cushman

[57] ABSTRACT

A torque transmission device has aligned input and output shafts which are interconnected by two coupling members which are in driving engagement by the input and output shafts for rotation in respective opposite directions. The coupling members have limited relative rotational movement and are biased into engagement with the shafts by a torsion device which extends between them. The arrangement is such that drive is always transmitted through the torsion device, irrespective of direction of rotation. A brake is responsive to relative rotation between the input and output shafts.

12 Claims, 3 Drawing Figures

TORQUE TRANSMITTING DEVICE WITH TORQUE LIMITING DEVICE

This invention relates to a torque transmitting device with a torque limiting brake and has as an object to provide such a device in a convenient form.

A torque transmitting device in accordance with the invention comprises an input drive member, a co-axial output drive member, first and second coupling members through which torque is transmitted from the input drive member, said coupling members each having abutment means engageable with both the input drive member and the output drive member, said coupling members being interengaged to permit limited relative angular movement therebetween about the common axis of the input and output members, pre-stressed torsion means applying a torque load to the coupling members in opposite directions to urge these to a limiting angular position relative to one another, whereby when the torque applied to the input drive member in either direction exceeds the pre-stressing of the torsion means, the drive members are moved relative to one another, and a brake actuable on such relative movement of the drive members to prevent turning thereof.

Figure 1:
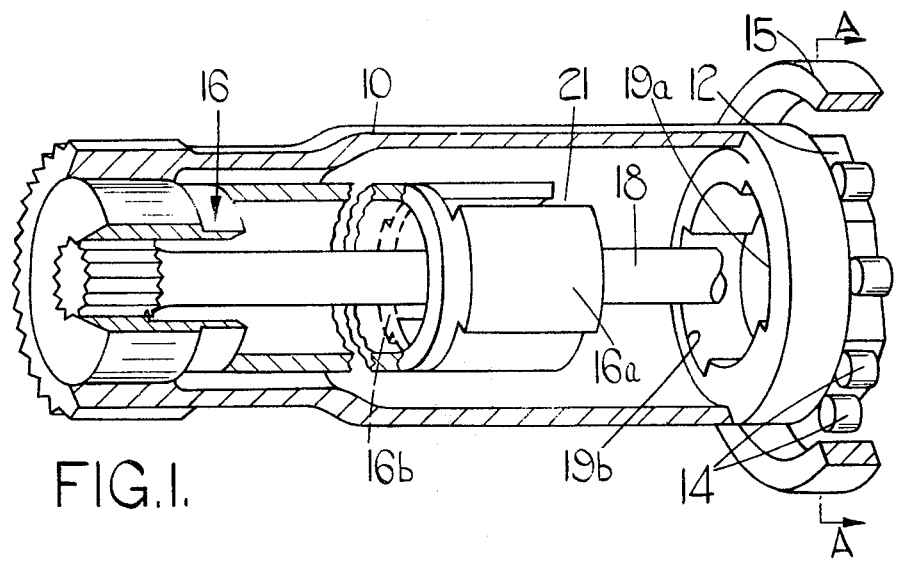
Figure 2:
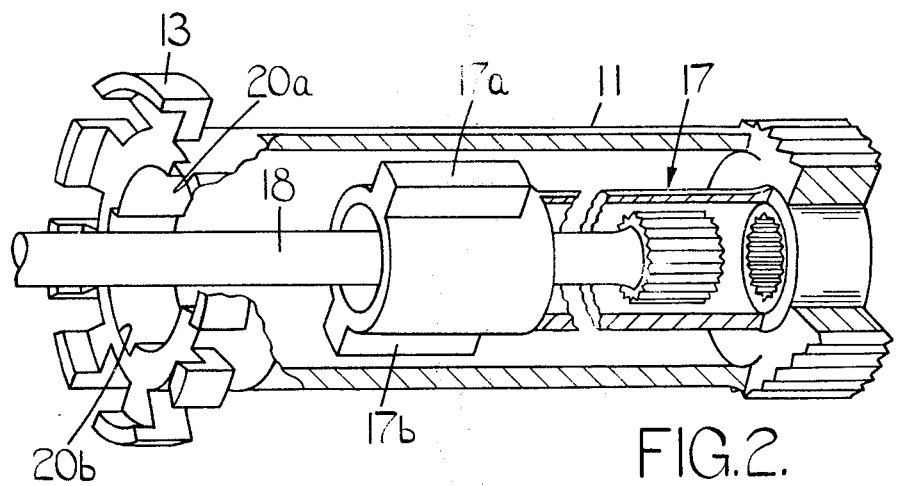
Figure 3:
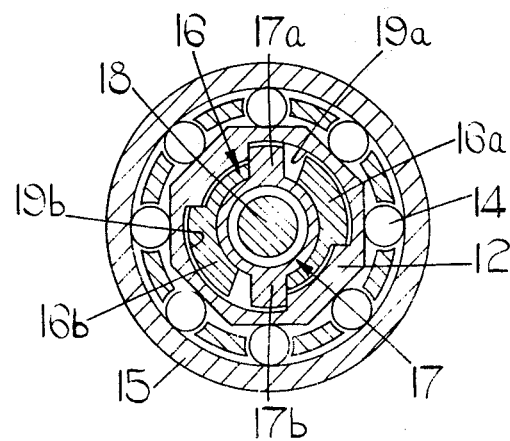

In the accompanying drawings,

FIGS. 1 and 2 are exploded perspective views of respective aligned parts of one example of a torque transmitting device in accordance with the invention, and FIG. 3 is a section on line A—A in FIG. 1.

The device shown includes an input member 10 and an output member 11 both of which are of generally tubular configuration. The two members 10 and 11 are co-axial and are arranged in an end relationship.

A brake is provided for locking the members when these are displaced angularly about their common longitudinal axis relative to one another. This brake includes a polygonal cam 12 on the end of the member 10 and a surrounding roller cage 13 on the end of the member 11. Rollers 14 are received by the cage 13 and engage the faces of the cam 12. A ring 15 surrounds the rollers 14 so that when relative angular displacement occurs the rollers 14 are urged outwardly by the cam 12 and frictionally engage the interior of the ring 15. Ring 15 is restrained from rotation.

The members 10 and 11 are interconnected solely by first and second generally tubular coupling members 16, 17 mounted for free rotation within the members 10 and 11 respectively. The member 17 has a pair of oppositely disposed fins 17a, 17b which are received in slots 21 in the end of the coupling member 16, the slots 21 being wide enough to permit limited relative angular movement between the members 16 and 17. The member 16 also has a pair of lobes 16a, 16b.

The two members 16, 17 have splined sockets at their opposite ends which are engaged by the ends of a torsion bar 18 which is pre-stressed to urge the members 16, 17 to the limiting position shown in FIG. 3. Such pre-stressing is effected by twisting the bar 18 before its ends are engaged with the splined sockets.

Coupling members 16, 17 act as a key interconnecting the input and output members 10 and 11. Thus, as shown in FIG. 3 one side of each lobe 16a, 16b and the opposite side of the associated one of the fins 17a, 17b engage opposite sides of an associated one of a pair of keyways 19a, 19b in the member 10 inside the cam 12 and also engage a corresponding pair of keyways 20a, 20b in the member 11. Keyways 19a, 20a are, as shown, normally aligned, as are keyways 19b, 20b.

When torque is applied in a clockwise direction to input member 10, as viewed in FIG. 3, torque is transmitted from the keyways 19a, 19b to the fins 17a, 17b, through the torsion bar 18 to the lobes 16a, 16b and thence to output member 12 via the opposite sides of keyways 20a, 20b.

When anti-clockwise torque is applied it is transmitted from the member 10 to the lobes 16a, 16b and from the fins 17a, 17b to the member 11. In either case the torque tends to turn the member 17 in a clockwise direction relative to member 16. When the torque transmitted exceeds the pre-loading of the bar 18 the member 17 will turn in a clockwise direction relative to the member 16, allowing the necessary relative angular movement of the members 10 and 11 to engage the brake.

We claim:

1. A torque transmitting device comprising an input drive member, a co-axial output drive member, first and second coupling members through which torque is transmitted from the input drive member to the output drive member, said coupling members each having abutment means engageable with both the input drive member and the output drive member, said coupling members being interengaged to permit limited relative angular movement therebetween about the common axis of the input and output members, pre-stressed torsion means applying a torque load to the coupling members in opposite directions to urge these to a limiting angular position relative to one another, whereby when the torque applied to the input drive member in either direction exceeds the pre-stressing of the torsion means, the drive members are moved relative to one another, and a brake actuable on such relative movement of the drive members to prevent turning thereof.

2. A device as claimed in claim 1 in which said first and second coupling members are rotatable relative to said input and output drive members respectively.

3. A device as claimed in claim 2 in which said input drive member is tubular and surrounds said first coupling member.

4. A device as claimed in claim 2 in which said output drive member is tubular and surrounds said second coupling member.

5. A device as claimed in claim 3 in which said output drive member is tubular and surrounds said second coupling member.

6. A device as claimed in claim 5 in which both of said coupling members are tubular and said torsion means comprises a bar which extends through said coupling members.

7. A device as claimed in claim 6 in which opposite ends of said bar are in splined engagement with said first and second coupling members respectively.

8. A device as claimed in claim 1 in which said input drive member is provided with a keyway, and said abutment means on the first coupling member comprises a projection engageable with one face of said keyway.

9. A device as claimed in claim 8 in which said abutment means on said second coupling member comprises a projection engageable with an opposite face of said keyway.

10. A device as claimed in claim 9 in which said output drive member is provided with a keyway, which is aligned with said input member keyway, said projections on said first and second coupling members engaging respective opposite faces of said output drive member keyway.

11. A device as claimed in claim 1 in which said brake comprises a plurality of brake elements circumferentially located around one of said drive members, a cam rotatable by the other of said drive members and engaging said brake elements to urge the latter in directions radially of the axis of said drive members as a result of relative rotation between said drive members, and a brake ring engageable by said brake elements.

12. A device as claimed in claim 11 in which said brake ring surrounds said brake elements and said cam lies within said elements and is operable to urge them radially outwardly.

* * * * *